UNITED STATES PATENT OFFICE.

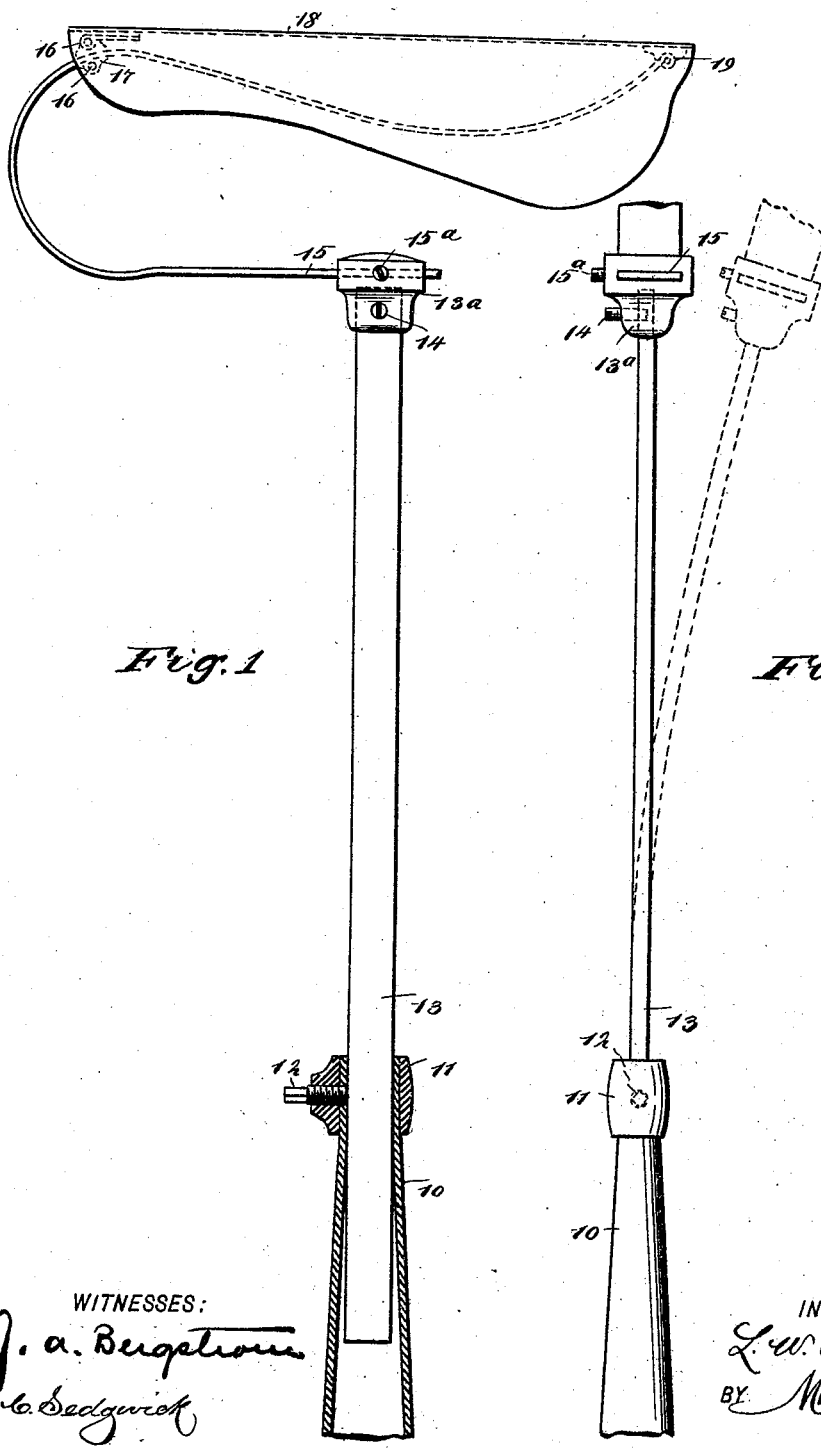

LEWIS W. HARPER, OF NEW YORK MILLS, MINNESOTA.

VELOCIPEDE-SADDLE.

SPECIFICATION forming part of Letters Patent No. 501,782, dated July 18, 1893.

Application filed April 14, 1893. Serial No. 470,281. (No model.)

*To all whom it may concern:*

Be it known that I, LEWIS WILSON HARPER, of New York Mills, in the county of Otter Tail and State of Minnesota, have invented a new and Improved Supporting-Stem for Velocipede-Saddles, of which the following is a full, clear, and exact description.

My invention relates to improvements in stems for supporting saddles of velocipedes of various kinds, and especially such as are adapted to support the saddles of unicycles or other machines in which it is desirable that the body of the rider be easily swayed or moved to one side, so as to shift the center of gravity and thus enable the machine to be readily turned or steered.

The object of my invention is to produce a stem of this kind which is of the utmost simplicity and cheapness and which may be conveniently applied to any saddle and to any machine.

To this end my invention consists of a supporting stem for velocipede saddles, which will be hereinafter described and claimed.

Reference is to be had to the accompanying drawings forming a part of this specification, in which similar figures of reference indicate corresponding parts in both the views.

Figure 1 is a side elevation of the stem as applied to a saddle and with its supporting socket in section; and Fig. 2 is a front elevation of the stem and its support, the movement of the stem being illustrated by dotted lines.

As illustrated, a suitable socket 10 is provided to support the saddle stem, and this socket may be arranged upon any kind of a frame. The socket is preferably provided with a strengthening ring 11 which is thickened on one side to receive the set screw 12, and this projects through the ring and socket so as to impinge on one edge of the saddle supporting stem 13, and by the screw the stem may be held at any desired height. I do not, however, confine myself to this particular fastening device, as any suitable equivalent may be used.

The stem 13 is made of spring material so that it may sway or swing laterally, as shown by dotted lines in Fig. 2, but it has sufficient stiffness to maintain its vertical position under ordinary circumstances, so as to carry the saddle and rider in the center of the machine. The bending of the stem may be effected by the rider, either by throwing his weight to one side or by pulling himself to one side by means of his grip upon the handles of the machine.

The stem 13 is provided at its upper end with a head 13ª into which the stem extends and which is fastened to the stem by means of a set screw 14 or equivalent fastening. The head 13ª is slotted horizontally, near its upper end, to receive the saddle spring 15 which is secured to the head by a set screw 15ª, and this spring is curved forward and upward so as to pass between rollers 16 on a hanger 17 which is secured to the under side and front end of the saddle 18; and the spring extends rearward and is pivoted at its upper terminus to the rear end of the saddle, as shown at 19. The saddle may be of any kind whatever, and it may be secured to the stem 13 in any convenient way without affecting the principle of my invention.

Having thus described my invention, I claim as new and desire to secure by Letters Patent—

1. As an improved article of manufacture, a supporting stem for velocipede saddles, the stem being formed of spring material and adapted to sway laterally, substantially as described.

2. The combination, with a velocipede saddle, of a spring stem to support the same, the stem being held normally vertical but adapted to sway laterally under pressure, substantially as described.

3. The combination, with a saddle for velocipedes, of a spring stem to support the saddle, the stem being adapted to sway laterally, and a supporting socket for the stem, substantially as described.

4. The combination, with the spring supporting stem adapted to be secured to a machine, of a slotted head carried at the upper end of the stem and adapted to connect with a saddle spring, substantially as described.

LEWIS W. HARPER.

Witnesses:
ED. O'LEARY,
R. M. CLARK.